United States Patent [19]
Yoshida

[11] Patent Number: 6,122,071
[45] Date of Patent: *Sep. 19, 2000

[54] FACSIMILE APPARATUS CAPABLE OF EXECUTING COMMUNICATION PROTOCOL FOR IDENTIFYING TYPE OF MODEM OF DESTINATION STATION

[75] Inventor: Takehiro Yoshida, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/594,281

[22] Filed: Jan. 30, 1996

[30] Foreign Application Priority Data

Jan. 31, 1995 [JP] Japan .................................. 7-034247

[51] Int. Cl.⁷ .............................. H04N 1/00; H04N 1/32
[52] U.S. Cl. ...................... 358/434; 358/435; 358/442; 379/93.33
[58] Field of Search ................................ 258/412, 434, 258/435, 436, 438, 442, 468; 379/100.01, 93.31, 93.32, 93.33, 93.34; 370/160, 161, 276–279, 293, 294, 296; 375/222; H04N 1/32

[56] References Cited

U.S. PATENT DOCUMENTS

| | | | |
|---|---|---|---|
| 4,729,033 | 3/1988 | Yoshida | 358/257 |
| 4,814,894 | 3/1989 | Yoshida | 358/298 |
| 4,829,524 | 5/1989 | Yoshida | 371/32 |
| 4,885,755 | 12/1989 | Yoshida | 375/58 |
| 5,022,072 | 6/1991 | Sakakibara et al. | 379/100 |
| 5,031,179 | 7/1991 | Yoshida et al. | 371/32 |
| 5,159,465 | 10/1992 | Maemura et al. | 358/434 |
| 5,172,246 | 12/1992 | Yoshida | 358/406 |
| 5,216,705 | 6/1993 | Yoshida et al. | 379/100 |
| 5,220,439 | 6/1993 | Yoshida | 358/404 |
| 5,233,627 | 8/1993 | Kozima et al. | 375/222 |
| 5,243,438 | 9/1993 | Anderton et al. | 358/468 |
| 5,307,179 | 4/1994 | Yoshida | 358/440 |
| 5,351,134 | 9/1994 | Yaguchi et al. | 358/412 |
| 5,404,394 | 4/1995 | Dimolitsas et al. | 379/100 |
| 5,438,427 | 8/1995 | Yoshida | 358/405 |
| 5,617,220 | 4/1997 | Ueno | 358/434 |
| 5,636,037 | 6/1997 | Saitoh | 358/468 |
| 5,661,568 | 8/1997 | Ueno | 358/436 |
| 5,721,731 | 2/1998 | Yoshida | 370/296 |
| 5,732,104 | 3/1998 | Brown et al. | 375/222 |

*Primary Examiner*—Madeleine Nguyen
*Attorney, Agent, or Firm*—Fitzpatrick, Cella, Harper & Scinto

[57] ABSTRACT

A data communication apparatus for executing a first communication protocol by a low rate modem and executing data communication by a high rate modem in accordance with the first communication protocol includes a communication protocol unit for executing a second communication protocol for identifying a type of a modem of a destination station and designating a modem to be used for the communication and a control unit for causing said communication protocol unit to designate the execution of the first communication protocol by said low rate modem in accordance with the type of modem of the destination station identified by said communication protocol unit.

14 Claims, 11 Drawing Sheets

FIG. 8

V.8 PREAMBLE

| 0 | 0 | 1 | 1 | 1 | 1 | 1 | 1 | 1 | 1 | TEN '1's PRECEDING TO INFORMATION SEQUENCE |
|---|---|---|---|---|---|---|---|---|---|---|
| 0 | 0 | 0 | 0 | 0 | 0 | 0 | 0 | 0 | 1 | CI SEQUENCE SYNCHRONIZATION CODE |
| 0 | 0 | 0 | 0 | 0 | 1 | 1 | 1 | 1 | 1 | SYNCHRONIZATION CODE FOR CM AND JM SEQUENCE |

FIG. 9

V.8 INFORMATION CATEGORY

| start | b0 | b1 | b2 | b3 | b4 | b5 | b6 | b7 | stop | DETERMINE BY CATEGORY OCTET (B4=0) TAGS b0-b3 |
|---|---|---|---|---|---|---|---|---|---|---|
| 0 | 1 | 0 | 0 | 0 | 0 | x | x | x | 1 | CALL FUNCTION |
| 0 | 1 | 0 | 1 | 0 | 0 | x | x | x | 1 | MODULATION MODE |
| 0 | 0 | 1 | 0 | 1 | 0 | x | x | x | 1 | PROTOCOL |
| 0 | 1 | 0 | 1 | 1 | 0 | x | x | x | 1 | GSTN ACCESS |

FIG. 10

V.8 CALL FUNCTION CATEGORY

| start | b0 | b1 | b2 | b3 | b4 | b5 | b6 | b7 | stop | |
|-------|----|----|----|----|----|----|----|----|------|---|
| 0 | 1 | 0 | 0 | 0 | 0 | | | | | OCTET-'callf 0' |
| | | | | | | | | | | TAGS b0-b3 INDICATING CALL FUNCTION CATEGORY |
| | | | | | 0 | | | | | INDICATES CATEGORY OCTET |
| | | | | | | 0 | 0 | 0 | | TO BE DETERMINED BY ITU-T IN FUTURE |
| | | | | | | 1 | 0 | 0 | | TO BE DETERMINED BY ITU-T IN FUTURE |
| | | | | | | 0 | 1 | 0 | | TEXT FONT IN ACCORDANCE WITH RECOMMENDATION V.18 |
| | | | | | | 1 | 1 | 0 | | TO BE DETERMINED BY ITU-T IN FUTURE |
| | | | | | | 0 | 0 | 1 | | TO BE DETERMINED BY ITU-T IN FUTURE |
| | | | | | | 1 | 0 | 1 | | TO BE DETERMINED BY ITU-T IN FUTURE |
| | | | | | | 0 | 1 | 1 | | TRANSMIT AND RECEIVE DATA |
| | | | | | | 1 | 1 | 1 | | CALL FUNCTION DISPLAYED BY EXPANDED OCTET |
| | | | | | | | | | 1 | STOP BIT |

FIG. 11

V.8 MODULATION MODE

| start | b0 | b1 | b2 | b3 | b4 | b5 | b6 | b7 | stop | OCTET-'modn 0' | ITEM |
|---|---|---|---|---|---|---|---|---|---|---|---|
| 0 | 1 | 0 | 1 | 0 | | | | | | TAGS b0-b3 INDICATE MODULATION MODE CATEGORY | |
| | | | | | 0 | | | | | INDICATES CATEGORY OCTET | |
| | | | | | | 0 | | | | RESERVED FOR FUTURE DEFINITION BY ITU-T | 0 |
| | | | | | | | X | | | 1:V.34 FULL DUPLEX PERMITTED | 1 |
| | | | | | | | | X | | 1:V.34 HALF DUPLEX PERMITTED | 2 |
| | | | | | | | | | 1 | STOP BIT | |
| 0 | | | | | | | | | | OCTET-'modn 1' | |
| | X | | | | | | | | | 1:V.32bis/V.32 PERMITTED | 3 |
| | | X | | | | | | | | 1:V.22bis/V.22 PERMITTED | 4 |
| | | | X | | | | | | | 1:V.17 PERMITTED | 5 |
| | | | | 0 | 1 | 0 | | | | INDICATES EXPANDED OCTET | |
| | | | | | | | X | | | 1:V.29 HALF DUPLEX PERMITTED (T.30, ETC) | 6 |
| | | | | | | | | X | | 1:V.27ter PERMITTED | 7 |
| | | | | | | | | | 1 | STOP BIT | |
| 0 | | | | | | | | | | OCTET-'modn 2' | |
| | X | | | | | | | | | 1:V.26ter PERMITTED | 8 |
| | | X | | | | | | | | 1:V.26bis PERMITTED | 9 |
| | | | X | | | | | | | 1:V.23 FULL DUPLEX PERMITTED | 10 |
| | | | | 0 | 1 | 0 | | | | INDICATES EXPANDED OCTET | |
| | | | | | | | X | | | 1:V.23 HALF DUPLEX PERMITTED | 11 |
| | | | | | | | | X | | 1:V.21 PERMITTED | 12 |
| | | | | | | | | | 1 | STOP BIT | |

FIG. 12    V.8 PROTOCOL CATEGORY

| start | b0 | b1 | b2 | b3 | b4 | b5 | b6 | b7 | stop | |
|---|---|---|---|---|---|---|---|---|---|---|
| 0 | 0 | 1 | 0 | 1 |  |  |  |  |  | OCTET-'prot 0' |
|  |  |  |  |  |  |  |  |  |  | TAGS b0-b3 INDICATE PROTOCOL CATEGORY |
|  |  |  |  |  | 0 |  |  |  |  | INDICATES CATEGORY OCTET |
|  |  |  |  |  |  | 1 | 0 | 0 |  | CALL LAPM PROTOCOL OF RECOMMENDATION V.24 |
|  |  |  |  |  |  | 1 | 1 | 1 |  | PROTOCOL CALL IS DISPLAYED BY EXPANDED OCTET |
|  |  |  |  |  |  |  |  |  | 1 | STOP BIT |

NOTE: FAILURE OF OCTET DOES NOT PREVENT NEGOTIATION OF PROTOCOL BY OTHER METHOD

FIG. 13    V.8 GSTN ACCESS CATEGORY

| start | b0 | b1 | b2 | b3 | b4 | b5 | b6 | b7 | stop | |
|---|---|---|---|---|---|---|---|---|---|---|
| 0 | 1 | 0 | 1 | 1 |  |  |  |  |  | OCTET-'access 0' |
|  |  |  |  |  |  |  |  |  |  | TAGS b0-b3 INDICATE GSTN ACCESS CATEGORY |
|  |  |  |  |  | 0 |  |  |  |  | INDICATES CATEGORY OCTET |
|  |  |  |  |  |  | X |  |  |  | 1:CALLING DCE CONNECTS CELLULAR |
|  |  |  |  |  |  |  | X |  |  | 1:ACKNOWLEDGING DCE CONNECTS CELLULAR |
|  |  |  |  |  |  |  |  | 0 |  | RESERVED FOR FUTURE DEFINITION BY ITU-T |
|  |  |  |  |  |  |  |  |  | 1 | STOP BIT |

NOTE: WHEN OCTET FAILS, NO INFORMATION ON TYPE OF GSTN IS SENT

FIG. 14

BIT DEFINITION OF V.8 INF00 SEQUENCE

| INF00 BITS LSB:MSB | DEFINITION |
|---|---|
| 0:3 | FILL BITS:1111 |
| 4:11 | FRAME SYNC:01110010 (LEFTMOST IS LEADING BIT) |
| 12 | 1:SUPPORTS SYMBOL RATE OF 2743 |
| 13 | 1:SUPPORTS SYMBOL RATE OF 2800 |
| 14 | 1:SUPPORTS SYMBOL RATE OF 3429 |
| 15 | 1:LOW CARRIER FREQUENCY TRANSMISSION ABILITY AT SYMBOL RATE OF 3000 |
| 16 | 1:HIGH CARRIER FREQUENCY TRANSMISSION ABILITY AT SYMBOL RATE OF 3000 |
| 17 | 1:LOW CARRIER FREQUENCY TRANSMISSION ABILITY AT SYMBOL RATE OF 3200 |
| 18 | 1:HIGH CARRIER FREQUENCY TRANSMISSION ABILITY AT SYMBOL RATE OF 3200 |
| 19 | 0:NON-PERMISSION OF TRANSMISSION AT SYMBOL RATE OF 3429 |
| 20 | 1:ABILITY OF SUPPRESSING TRANSMISSION POWER BELOW NORMAL SETTING |
| 21:23 | MAXIMUM ALLOWABLE SYMBOL RATE DIFFERENCE IN TRANSMISSION AND RECEPTION. SYMBOL RATE ASSIGNED IN ASCENDING ORDER, eg 0 FOR 2400 AND 5 FOR 3429, INTEGERS 0 TO 5 INDICATE DIFFERENCE FROM PERMITTED NUMBER OF STEPS OF SYMBOL RATE |
| 24 | SET INF00 SEQUENCE SENT FROM CME MODEM TO 1 |
| 25 | SPARE. THIS BIT IS SET TO 0 BY TRANSMITTER MODEM AND IT IS NOT CONSIDERED BY RECEIVER MODEM |
| 26:27 | TRANSMISSION CLOCK SOURCE. 0:INTERNAL, 1:SYNCHRONIZED WITH RECEIVE TIMING, 2:EXTERNAL, 3:SPARE |
| 28 | DURING ERROR RECOVERY PROCESS, 1 IS SET BY RECOGNITION OF EXACT RECEPTION OF INF00 FRAME |
| 29:44 | CRC |
| 45:48 | FILL BIT:1111 |

NOTE: BITS 12 TO 14 ARE USED TO INDICATE MODEM ABILITY AND/OR SETTING. BITS 15 TO 20 DEPEND ON ADJUSTMENT REQUEST AND ARE APPLIED ONLY TO MODEM TRANSMISSION UNIT

NOTE: BIT 24 MAY BE USED IN CONJUNCTION WITH GSTN ACCESS CLASS DEFINED IN RECOMMENDATION V.8 TO DETERMINE OPTIMUM PARAMETER FOR SIGNAL CONVERTER AND ERROR CONTROL FUNCTION IN CALLING MODEM, ACKNOWLEDGING MODEM AND INTERMEDIATE CME

FACSIMILE APPARATUS CAPABLE OF EXECUTING COMMUNICATION PROTOCOL FOR IDENTIFYING TYPE OF MODEM OF DESTINATION STATION

BACKGROUND OF THE INVENTION

1. Field of the Invention

The present invention relates to a facsimile apparatus capable of executing a communication protocol for identifying a type of modem of a destination station.

2. Related Background Art

Data communication by a computer and image communication by a facsimile apparatus have recently been conducted frequently. Various modems are used for those communications and the communication cannot be executed between two communication apparatuses unless modems thereof are of the same type. Thus, a communication protocol for identifying the types of the modems between the two communication apparatuses is recommended by the ITU-T as V.8.

The types of modem used in a common telephone line include V.34, V.32, V.17, V.29, V.27ter, V.21 etc. The communication protocol V.8 is to identify the modem for one of the V.34, V.32, V.17, V.29, V.27ter, V.21 etc. For the data communication by the computer, one of the modems compatible with a destination station which has the highest communication rate is selected for the data communication.

However, in the G3 facsimile apparatus, the communication protocol is executed by the modem of the V.21 in accordance with the Recommendation T.30 and a transmission rate of the image data is determined (a modem for the image data communication is determined) in accordance with the communication protocol. Accordingly, when a modem of the highest rate among the modems compatible with the destination station is simply selected by the V.8 protocol, a facsimile communication by the T.30 cannot be executed following to the V.8 protocol.

Namely, when the V.8 protocol is used, the communication which communicates the data and the protocol by the modems of the same type such as one by the computer can utilize the V.8 protocol as it is but the communication which executes the protocol by a low rate modem among the modems included in the system and executes the image data communication by a high rate modem cannot utilize the V.8 protocol as it is.

SUMMARY OF THE INVENTION

It is an object of the present invention to improve a facsimile apparatus in the light of the above problems.

It is another object of the present invention to provide a facsimile apparatus which can execute a proper facsimile communication following to a communication protocol for identifying a type of a modem of a destination station.

Other objects of the present invention will be apparent from the following description of the embodiments and the drawings.

BRIEF DESCRIPTION OF THE PREFERRED EMBODIMENTS

FIG. 1 shows a block diagram of a configuration of a first embodiment of a facsimile apparatus of the present invention, FIG. 2 shows a flow chart of an operation of a control circuit in a transmission mode to a destination station (called terminal) which supports the V.8 protocol by using the facsimile apparatus of FIG. 1 as a calling terminal, FIG. 3 shows an example of a transmission control protocol applied to the facsimile apparatus of FIG. 1, FIG. 4 shows another example of the transmission control protocol applied to the facsimile apparatus of FIG. 1, FIG. 5 shows a flow chart of an operation of the control circuit in a transmission mode to the destination station (called terminal) which supports the V.8 protocol by using a second embodiment of the facsimile apparatus of the present invention as a calling terminal, FIG. 6 shows a flow chart of the control circuit in a receive mode from a sending station (calling terminal) which supports the V.8 protocol by using a third embodiment of the facsimile apparatus of the present invention as a called terminal, FIG. 7 shows a flow chart of the control circuit in a receive mode from a sending station (calling terminal) which supports the V.8 protocol by using a fourth embodiment of the facsimile apparatus of the present invention as a called terminal, FIG. 8 shows a format of a preamble contained in the V.8 protocol signal of the ITU-T Recommendation, FIG. 9 shows a format of a category octet for determining an information category of the V.8 protocol signal of the ITU-T Recommendation, FIG. 10 shows an example of use of bits of a call function octet, FIG. 11 shows a modulation mode designated by the V.8 protocol signal of the ITU-T Recommendation, FIG. 12 shows a list of codes in a protocol category of the V.8 protocol signal of the ITU-T Recommendation, FIG. 13 shows a code representing a cellular access for connecting to GSTN of the V.8 protocol signal of the ITU-T Recommendation, and FIG. 14 shows a bit definition of INFO0 sequence of the V.34 of the ITU-T Recommendation.

DETAILED DESCRIPTION OF THE PREFERRED EMBODIMENTS

Figure 1:
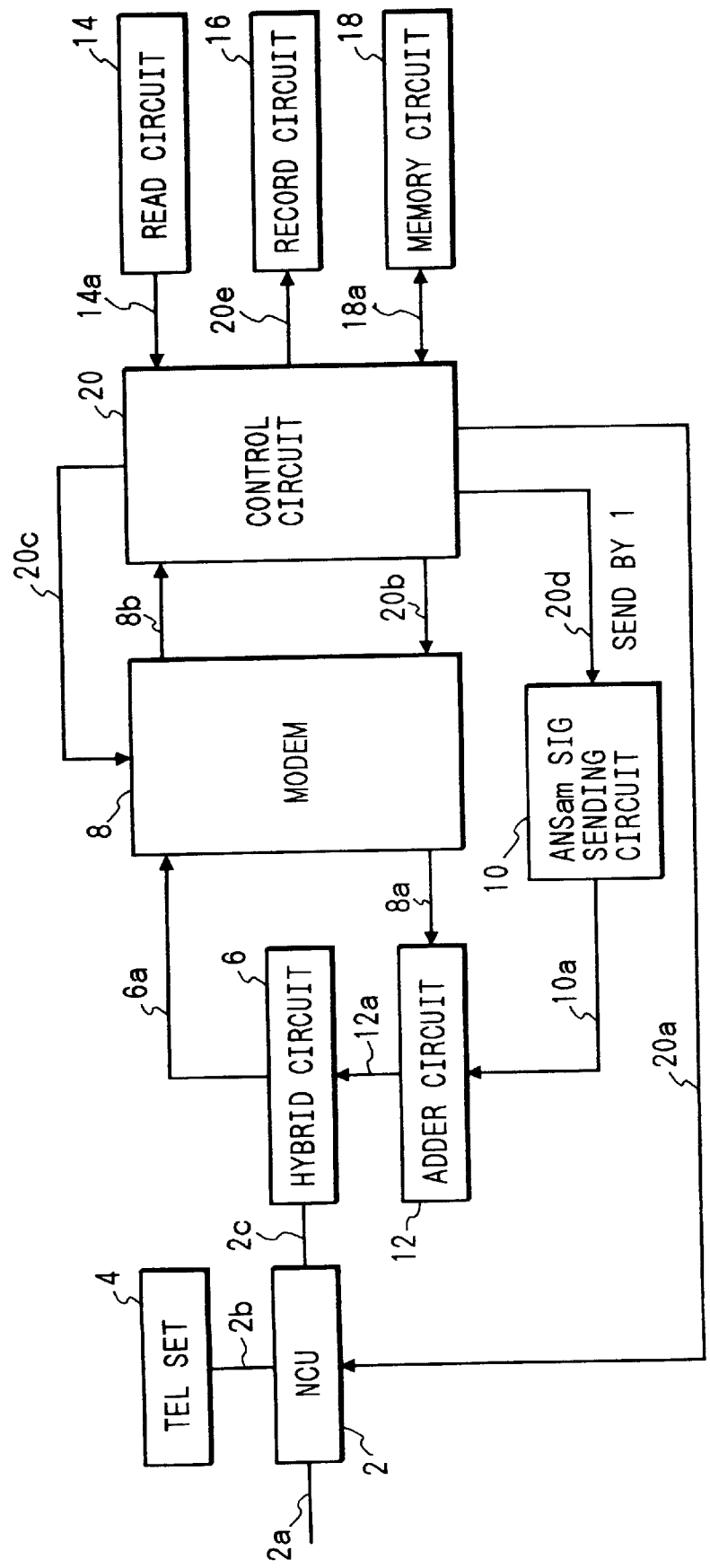

The embodiments of the present invention are now explained in detail with reference to the drawings.

First, referring to FIGS. 8 to 13, the V.8 protocol signal recommended by the ITU-T is explained. FIG. 8 shows a format of a preamble contained in the V.8 protocol signal of the ITU-T recommendation, FIG. 9 shows a format of a category octet for determining an information category of the V.8 protocol signal, of the ITU-T Recommendation, FIG. 10 shows an example of use of bits of a call function octet, FIG. 11 shows a modulation mode designated by the V.8 protocol of the ITU-T Recommendation, FIG. 12 shows a list of codes in a protocol category of the V.8 protocol signal of the ITU-T Recommendation, and FIG. 13 shows a code representing a cellular access for connecting to GSTN (General Switched Telephone Network) of the V.8 protocol signal of the ITU-T Recommendation.

The V.8 protocol signal contains a call menu signal (hereinafter referred to as CM), a CM terminator (hereinafter referred to as CJ) and a common menu signal (hereinafter referred to as JM).

The CM is sent from a calling DCE (Data Circuit Terminating Equipment) and it is primarily used to indicate a modulation system available in the calling DCE. The CM comprises a repetitive bit sequence of 300 bits/s modulated by a low band channel V.21 (L) defined by the Recommendation V.21.

The CJ represents the acknowledgment of the detection of the JM and the end of the CM. The CJ comprises three continuous all-'0' octets containing starts bits/s and stop bits/s, modulated by 300 bits/s.

The JM is sent from a responding DCE and it is primarily used to indicate available modulation systems common to the calling and responding DCEs. The JM comprises a repetitive bit sequence of 300 bits/s modulated by a high band channel V.21 (H) defined by the Recommendation V.21.

Referring to FIG. 8, coding formats of the CM, CJ and JM signals are explained.

A common coding format is used for the CM, CJ and JM, and each of the CM, CJ and JM signals comprises a repetitive bit sequence. As shown in FIG. 8, one sequence comprises first ten '1' and following ten bits of synchronization signal, followed by octets bearing information. Each octet has a start bit ('0') at the head and a following stop bit ('1') at the end added thereto. For the JM, a code restriction condition is imparted such that an HDLC (High Level Data Link Control) flag (01111110) never appears in the bit arrangement in order to avoid confusion with the Recommendation T.30 which uses the same V.21 (H) modulation.

Each octet belongs to one information category. The encoding format permits the expansion of the information category for a special application provided that the simplicity of information is followed by most applications.

The first information category in one sequence must be a call function. In the subsequent information categories, the sequence is not particularly defined. All information in one category are transmitted in one octet, or if required, in one octet sequence of a predetermined order.

Referring to FIG. 9, the category octet is explained.

The category octet is an octet which is first generated in a new information category and it includes a 4-bit code for determining the information category.

The format comprises as follows and the bits shown are sent in the order of left to right.

Start bit (0) b0 b1 b2 0 1 0 b6 b7 stop bit (1)

As shown in FIG. 9, the bits b0 to b3 form a category having the bit b0 as the least significant bit, and the bit b4 is set to '0' to prevent the flag from being set. The bits b5 to b7 are option bits of the information category.

When three option bits are not sufficient to represent a particular category, any number of expanded octets may follow immediately after the category octet.

A format of the expanded octet comprises as follows:

Start bit (0) b0 b1 b2 0 1 0 b6 b7 stop bit (1)

The bits b0 to b2, b6 and b7 are five bits added to the current category. The bit b4 is set to '1' in order to distinguish the expanded octet from the category octet and the bits b3 and b5 are set to '0' to prevent the flag from being set.

Referring to FIGS. 10 to 14, a call function, a modulation mode, a protocol and a GSTN access which are the information category determined by the bits b0 to b3 are explained.

As shown in FIG. 10, three option bits in the call function octet are used to designate a specific call function.

As shown in FIG. 11, a V series modulation mode available in the GSTN is designated by three codes. The setting of being available is limited to only when the particular modulation mode is available in the displayed call function and it is desired to convey the capability to a remote DCE.

A list of codes in the protocol category is shown in FIG. 12. If an LAPM (Link Access Protocol Modem) protocol code is represented by the CM and a acknowledging DCE which received it wants to use the LAPM, too, a protocol octet representing the LAPM is also displayed in the JM.

A code for indicating a cellular access connected to the GSTN is shown in FIG. 13.

Referring to FIG. 14, information bits of the INFO0 defined by the V.34 are explained. FIG. 14 shows a bit definition of the INFO0 sequence of the V.34 by the ITU-T recommendation.

The INFO0 is used to indicate a transmission capability and bits thereof are defined as shown in FIG. 14.

In the present embodiment, INFO0a is defined as a signal sent from the called station and INFO0b is defined as a signal sent from the calling station.

[First Embodiment]

A first embodiment of the present invention is explained with reference to the drawings. FIG. 1 shows a block diagram of a configuration of the first embodiment of the facsimile apparatus of the present invention.

As shown in FIG. 1, the facsimile apparatus has a network control unit (hereinafter referred to as an NCU) 2 connected to a telephone line 2a. The NCU 2 controls the connection of a switching network and switches a data communication line such as connecting a telephone network to a line terminal for use for the data communication, and selectively switches the connection of the telephone line 2a and the telephone set 4, and the telephone line 2a and a hybrid circuit 6. The NCU 2 and the telephone set 4 are connected by a signal line 2b and the NCU 2 and the hybrid circuit 6 are connected by a signal line 2c. The switching operation of the NCU 2 is controlled by a control unit 20 to be described later. When a control signal supplied from the control circuit 20 through the signal line 20a is '0', the telephone line 2a and the telephone set 4 are connected. On the other hand, when the control signal is '1', the telephone line 2a and the hybrid circuit 6 are connected. In a normal state, the telephone line 2a and the telephone set 4 are connected.

The hybrid circuit 6 separates a transmission signal from a transmission channel to be transmitted through the telephone line 2a from a receiving signal received by a receiving channel through the telephone line 2a.

The transmission channel comprises a read circuit 14 including an image pick-up device such as a CCD (Charge Coupled Device) and an optical system an ANSam signal sending circuit 10.

The read circuit 14 sequentially reads one line of image along a main scan direction from a transmission document sheet and outputs data representing the read image to a signal line 14a.

When a signal of a level '1' is applied from the control circuit 20 through a signal line 20d, the ANSam signal sending circuit 10 outputs the ANSam signal to the signal line 10a. On the other hand, when a signal of a signal level '0' is applied to from the control circuit 20 to through the signal line 20d, the ANSam signal is not outputted to the signal line 10a. The data outputted from the read circuit 14 through the signal line 14a is applied to the control circuit 20. The control circuit 20 applies a coding process to the data read through the signal line 14a and the coded data is outputted to a modem 8 through the signal line 20b.

The modem 8 applies a modulation process to the coded data from the signal line 20b to generate a modulated signal and applies a demodulation process to the receiving signal read through the signal line 6a to generate demodulated data. The modulation process and the demodulation process are executed in accordance with the V.8, V.21, V.27ter, V.29, V.17 or V.34 of the ITU-T Recommendation. The content of the modulation process and the demodulation process by the modem 8 is indicated by a signal supplied from the control circuit 20 through the signal line 20c and a transmission mode is determined in accordance with the indicated modulation or demodulation process.

The modulated signal generated by the modem 8 is applied to an adder circuit 12 through a signal line 8a. The adder circuit 12 adds the modulated signal from the modem 8 and the ANSam signal from the ANSam signal sending circuit 10. The sum signal is outputted to the hybrid circuit 6 through a signal line 12a, and the hybrid circuit 6 sends the sum signal to the telephone line through the NCU 2 as the transmission signal.

On the other hand, in the receiving channel, the signal received from the sending station through the NCU 2 is outputted from the hybrid circuit 6 to the modem 8 through the signal line 6a. As described above, the modem 8 applies the demodulation process to the received signal read through the signal line 6a to generate the demodulated data. The demodulated data generated by the modem 8 is applied to the control circuit 20 through the signal line 20c. The control circuit 20 applies a decoding process to the demodulated data and the decoded data is applied to a record circuit 16 through a signal line 20e.

The record circuit 16 records the image represented by the decoded data on a record sheet sequentially line by line.

The data read by the read circuit 14, the coded data thereof, the received data and the decoded data thereof are stored in the memory circuit 18 as required.

The control circuit 20 controls the transmission to receive information from the sending station and send information to the destination station.

As the transmission control protocol for defining the transmission control, the protocol of the V.8, V.21, V.27ter, V.29, V.17 or V.34 of the ITU-T Recommendation is used. Specifically, the facsimile apparatus of the present embodiment is used as a calling terminal which receives an ANSam signal from a called terminal when the destination station (called terminal) which supports the V.8 protocol is called, sends a CM signal indicating that the image transmission by the V.34 is permitted to the called terminal, receives a JM signal from the called terminal, the V.8 protocol is executed to send a CJ signal to the called terminal when the JM signal indicates the image transmission by the V.34, and after the execution of the protocol, controls to shift to the transmission and reception of the INFO0c and INFO0a, that is, shift to the V.34 protocol and the image transmission. On the other hand, when the called terminal does not support the V.34, the JM signal from the called terminal indicates to execute the image transmission of one of the V.27ter, V.29 and V.17, and after the transmission of the CJ signal to the called terminal, the called terminal receives the NSF (Non-Standard Facility)/CSI (Called Station Identification)/DIS (Digital Identification Signal) signals, that is, controls the execution of the V.21 protocol or the execution of the image transmission by one of the V.27ter, V.29 and V.17.

Figure 2:
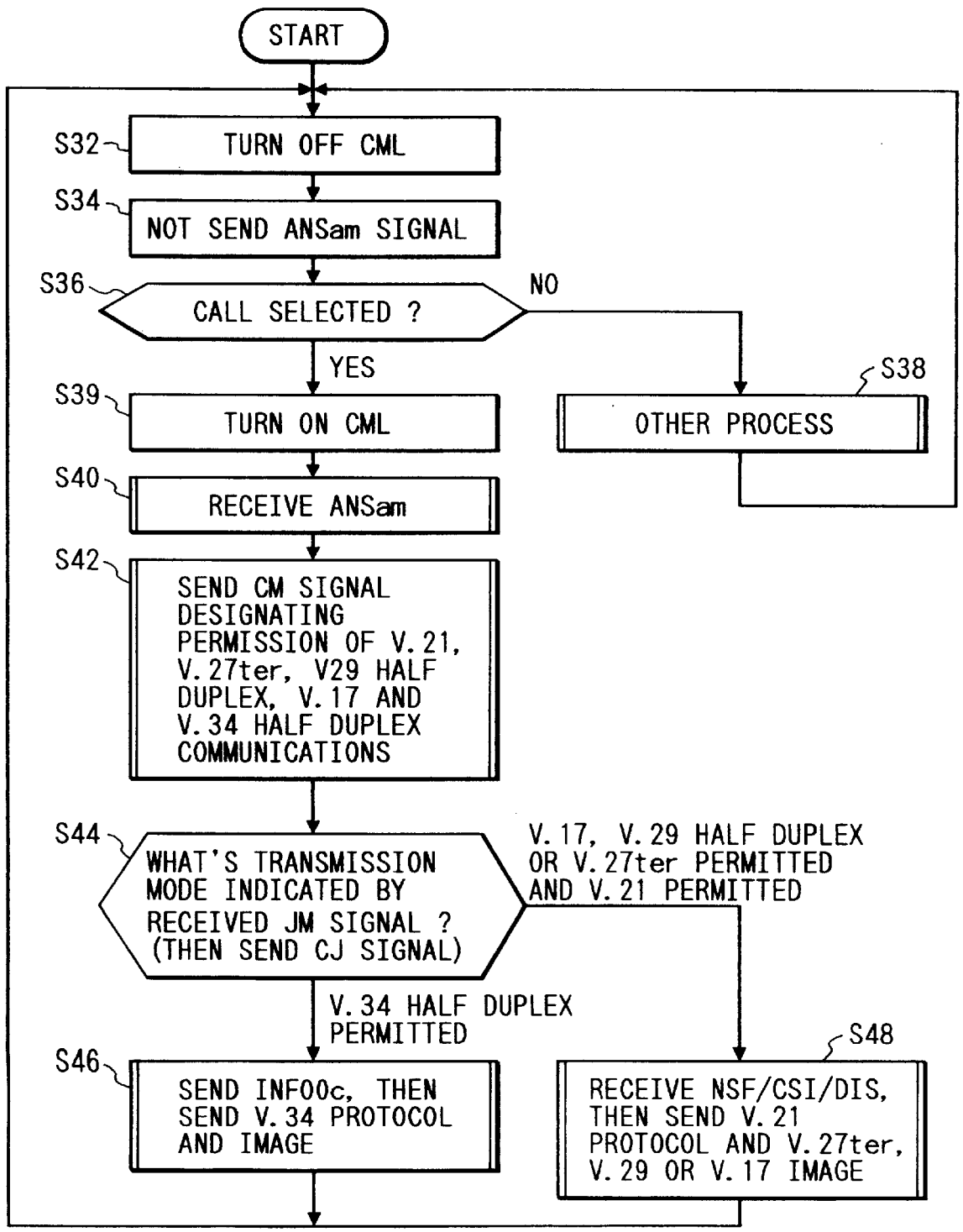

Referring to FIG. 2, the operation of the control circuit 20 in the transmission to the destination apparatus (called terminal) which supports the V.8 protocol by using the facsimile apparatus of the present embodiment as the calling terminal is explained. FIG. 2 shows a flow chart of the operation of the control circuit in the transmission to the destination apparatus (called terminal) which supports the V.8 protocol by using the facsimile apparatus of FIG. 1 as the calling terminal.

Referring to FIG. 2, a step S32 is first executed. On the step S32, a signal of a level '0' is outputted to the signal line 20a to turn off a CML (Communication Line) relay.

In a step S34, a signal of a level '0' is outputted to the signal line 20d to set not to output the ANSam signal.

Then, a step S36 is executed. In the step S36, whether a call has been selected or not is determined. If the call is not selected, a step S38 is executed, and if the call is selected, a step S39 is executed.

In the step S38, other process is executed. After the other process is executed, the process returns to the step S32.

In the step S39, a signal of the level '1' is outputted to the signal line 20a to turn on the CML.

After the execution of the step S39, a step S40 is executed. In the step S40, the ANSam signal from the called terminal is received.

Then, a step S42 is executed. In the step S42, the CM signal which indicates that the communication by the V.21, V.27ter, V.29 half duplex, V.17, V.35 half duplex is permitted is sent. In the CM signal, the items '12', '7', '6', '5' and '2' shown in FIG. 11 are set to '1'.

After the transmission of the CM signal, a step S44 is executed. In the step S44, the JM signal from the called terminal is received and the transmission mode indicated by the JM signal is determined. After the determination of the JM signal, the CJ signal is sent to the called terminal.

When the JM signal from the called terminal indicate the permission of the V.34 half duplex communication, that is, when the item '2' shown in FIG. 11 is '1', a step S46 is executed. In the step S46, after the transmission of the INFO0c, the V.34 protocol and image transmission is executed.

When the JM signal from the called terminal indicates the permission of the V.21 protocol and the permission of the V.27ter, V.29 half duplex and V.17 communication, that is, when the item '12' shown in FIG. 11 is '1' and any of the items '7', '6' and '5' is '1', a step S48 is executed. In the step S48, the reception of the NSF/CSI/DIS signals, that is, the execution of the V.21 protocol and the image transmission by one of the V.27ter, V.29 and V.17 are executed.

Figure 3:
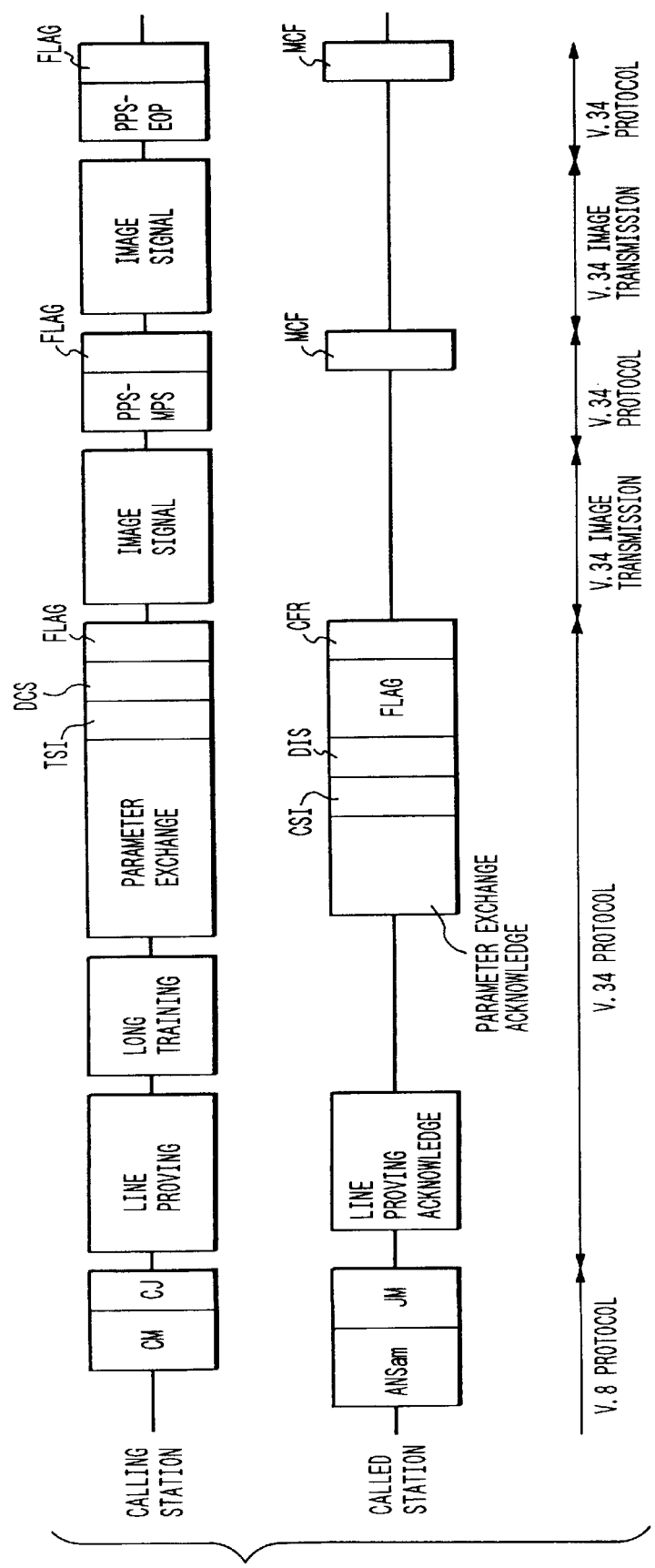
Figure 4:
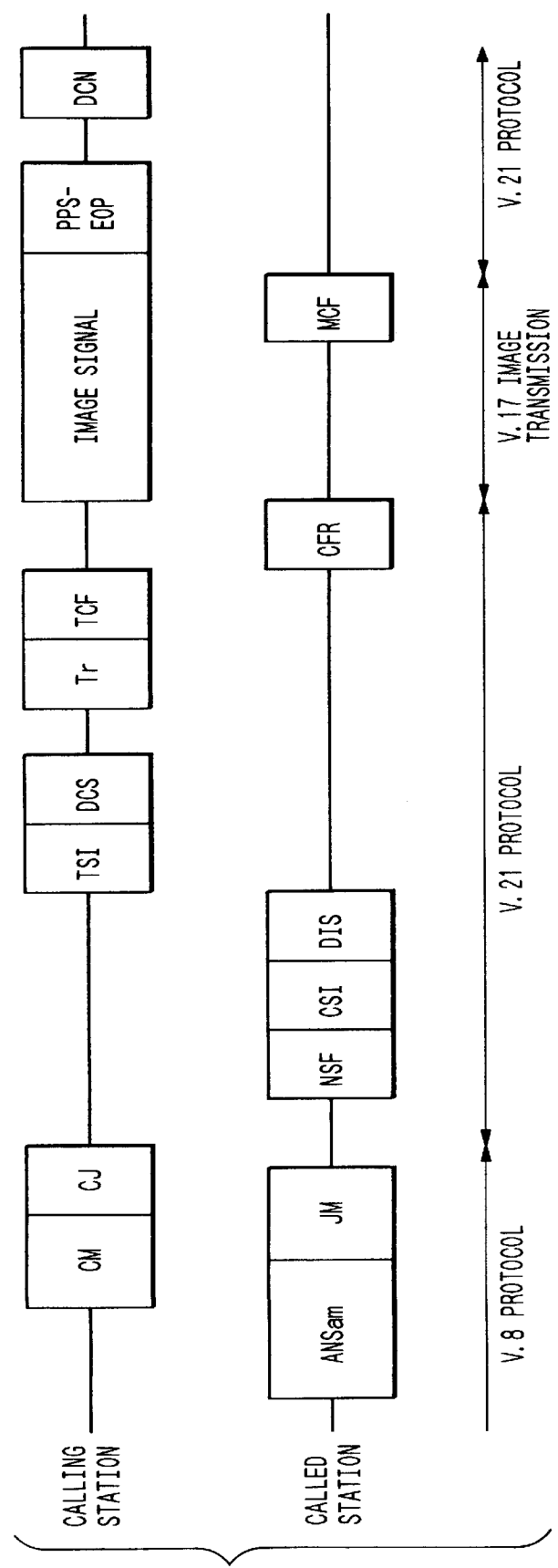

Referring to FIGS. 3 and 4, the above transmission control protocol is explained.

FIG. 3 shows an example of the transmission control protocol applied to the facsimile apparatus of FIG. 1, and FIG. 4 shows another example of the transmission control protocol applied to the facsimile apparatus of FIG. 1.

First, referring to FIG. 3, a protocol of the V.34 from the reception of the ANSam signal from the called terminal and the transmission control protocol up to the execution of the image transmission is explained.

Referring to FIG. 3, a signal which permits the full duplex communication from the called terminal (which is an ANS signal of 2100 Hz modulated by 15 Hz) is sent. The calling station sends the CM signal by the modulation by the V.8 and transmission modes executable in the image transmission are informed to the called terminal by the CM signal.

When the called terminal receives the CM signal, it informs a transmission mode (V.34 ) permitted for the reception among the transmission modes designated by the CM signal. The JM signal is used to inform it.

When the calling terminal receives the JM signal, it sends the CJ signal to inform the transmission mode to the called terminal.

After the transmission of the CJ signal, that is, after the elapse of 50 msec from the completion of the V.8 protocol, the calling terminal starts to execute the V.34 protocol and sends a line proving signal (having the INFO0c added at the top) to check a status of the telephone line 2a. The called terminal sends a signal (having INFO0a added at the top) to acknowledge the line proving signal from the calling terminal and informs to the calling terminal by that signal the subsequent transmission level, the amplitude level correction and the transmission baud rate.

After the elapse of 50 msec from the transmission of the line proving signal, the calling terminal sends a long training signal and the called terminal executes the adjustment of an equalizer of a modem and the detection of a timing based on the long training signal.

After the elapse of 50 msec from the transmission of the long training signal, the calling station sends a parameter exchange signal. The called terminal sends a signal acknowledging the parameter exchange signal and informs to the calling terminal by that signal the subsequent link correction and the bit rate.

After the called terminal acknowledges the parameter exchange signal, it sends CSI/DIS signals and sends a flag until it receives TSI (Transmission Station Identification)/ DCS (Digital Command Signal) signal from the calling terminal, and after it receives the TSI/DCS signals, it sends a CFR (Confirmation to Receive). When the calling terminal receives the CSI/DIS signals, it sends TSI/DCS signals and sends a flag until it receives the CFR signal from the called terminal.

After the elapse of 50 msec from the transmission of the flag, the calling terminal starts the image transmission by the V.34 to send the image signal. After the elapse of 50 msec from the completion of the transmission of the image signal, the protocol by the V.34 is executed and the calling terminal sends a PPS (Partial Page Signal)-MPS (Multi-Pages Signal) signal and sends a flag until it receives an MCF (Message Confirmation) signal from the called terminal. After the called terminal receives the PPS-MPS signal, it sends the MCF signal.

After the elapse of 50 msec from the transmission of the flag, the image transmission by the V.34 is executed and the calling terminal again sends the image signal. After the elapse of 50 msec from the completion of the transmission of the image signal, the calling terminal sends a PPS-EOP (End of page) signal and sends the MCF signal unit it receives the flag. After the called terminal receives the PPS-EOP signal, it sends the MCF signal. Thereafter, the same process is repeated until the image transmission is completed.

Referring to FIG. 4, a transmission control protocol from the reception of the ANSam signal from the called terminal to the execution of the V.21 protocol and the image transmission by the V.17 is explained.

Referring to FIG. 4, the V.8 protocol for transmitting and receiving the ANSam, CM, JM and CJ signals is executed and the permission of the V.21 protocol and the image transmission by the V.17 is informed to the calling terminal as the receivable transmission mode. After the V.8 protocol, the protocol by the V.21 is executed and the NSF/CSI/DIS, TSI/DCS, Tr(Training)·TCF (Training Check Frequency) and CFR signals are transmitted and received. After the transmission and reception of the signals, the image transmission by the V.17 is executed and PPS·EOP, MCF, DCN (Disconnect) signals by the V.21 protocol are transmitted and received.

By the above process, the use of the V.21, V.27ter, V.29 half duplex and V.17 communication or the V.34 half duplex communication is declared by the CM and JM signals defined by the V.8 and the V.8 protocol can be effectively utilized.

[Second Embodiment]

A second embodiment of the present invention is now explained with reference to the drawings.

A facsimile apparatus of the present embodiment has the identical configuration to that of the facsimile apparatus of the first embodiment. Unlike the first embodiment which supports the protocol by the V.8 and the protocol and image transmission by the V.34, the present embodiment supports the protocol by the V.8 but does not support the protocol and image transmission by the V.34.

Figure 5:
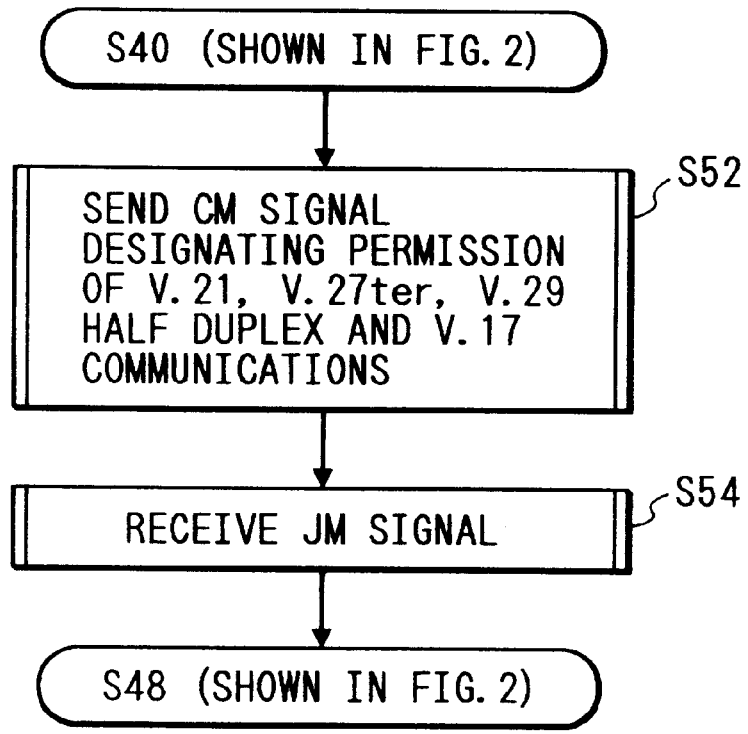

Referring to FIG. 5, an operation of the control circuit 20 in the transmission mode to a destination station (called terminal) which supports the V.8 protocol by using the facsimile apparatus of the present embodiment as a calling terminal is explained. FIG. 5 shows a flow chart of the operation of the control circuit in the transmission mode to the destination station (called terminal) which supports the V.8 protocol by using the facsimile apparatus of the second embodiment of the present invention as the calling terminal. FIG. 5 shows steps which are different from those of the first embodiment and the different steps are explained below.

In the step S40 (shown in FIG. 2), when the ANSam signal is received from the called terminal, a step S52 shown in FIG. 5 is executed.

In the step S52, the CM signal indicating that the V.21, V.27ter, V.29 half duplex and V.17 communications are permitted is sent. In the CM signal, the items '12', '7', '6' and '5' are set to '1'.

After the CM signal is sent, a step S54 is executed. In the step S54, the JM signal from the called terminal is received and the transmission mode indicated by the JM signal is determined. After the determination of the JM signal, the CJ signal is sent to the called terminal.

Then, a step S48 (shown in FIG. 2) is executed. In the step S48, the reception of the NSF/CSI/DIS signals is executed, that is, the V.21 protocol is executed and the image transmission by one of the V.27ter, V.29 and V.17 is executed.

[Third Embodiment]

A third embodiment is now explained with reference to the drawings.

A facsimile apparatus of the present embodiment has the identical configuration to that of the facsimile apparatus of the first embodiment. The present embodiment is used as a called terminal which supports the V.8 protocol and the V.34 protocol and image transmission, and in the receive mode, it executes the V.8 protocol to send the ANSam signal to the calling terminal, receive the CM signal indicating the permission of the image transmission by the V.34 from the calling terminal, send the JM signal indicating the image transmission by the V.34 to the calling terminal and receive the CJ signal from the calling terminal, and then controls the shift to the transmission and reception of the INFO0c and INFO0a, that is, the shift to the V.34 protocol and image transmission. On the other hand, when the calling station does not support the V.34, the CM signal from the calling terminal indicates the image transmission by one of the V.27ter, V.29 and V.17 and the JM signal indicating the image transmission by one of the V.27ter, V.29 and V.17 is sent to the calling terminal, and after the CJ signal is received from the calling terminal, the transmission of the NSF/CSI/DIS signals, that is, the execution of the V.21 protocol and the image transmission by one of the V.27ter, V.29 and V.17 is controlled.

Figure 6:
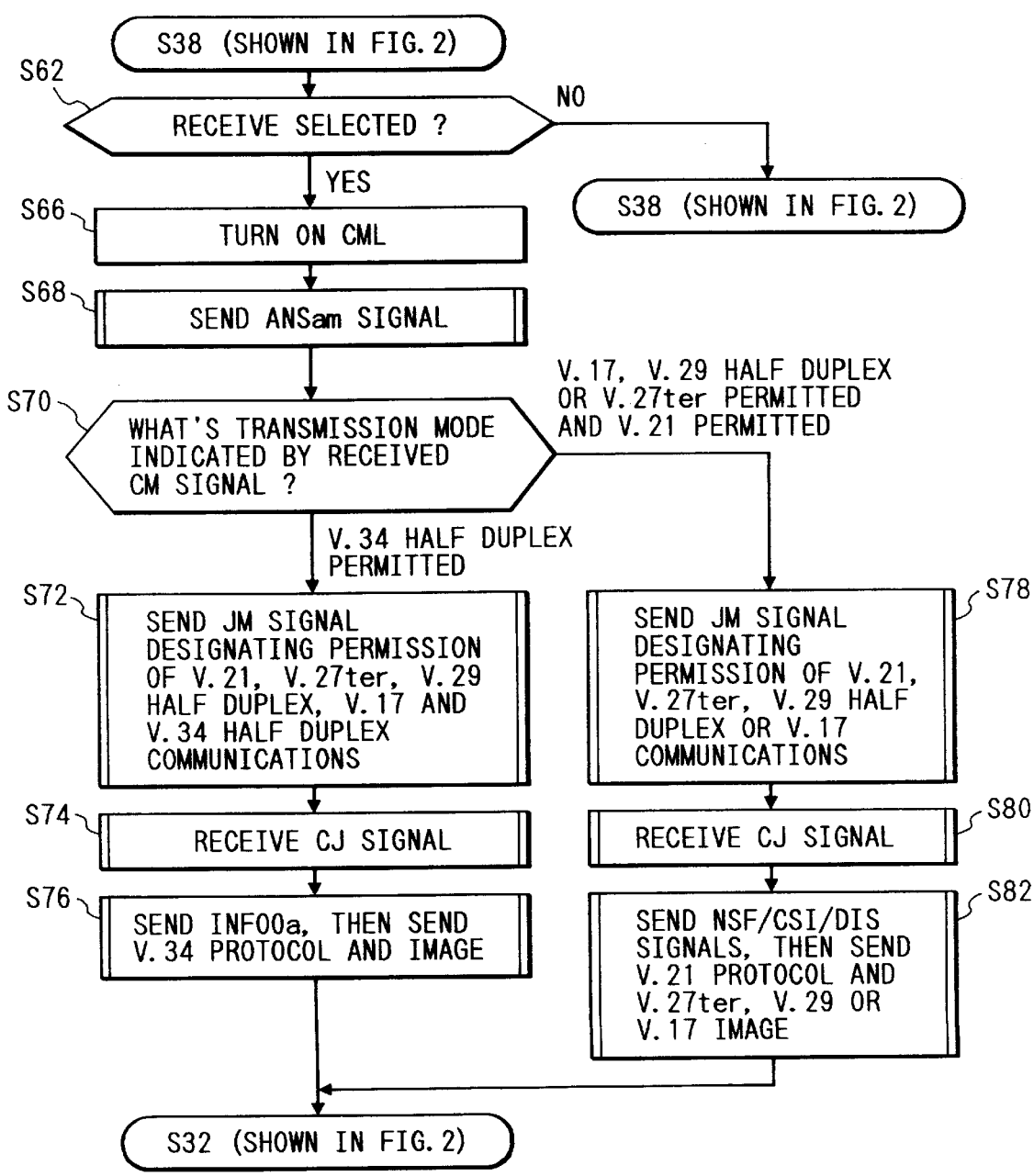

Referring to FIG. 6, the operation of the control circuit 20 in the receive mode from the sending station (calling terminal) which supports the V.8 protocol by using the facsimile apparatus of the present embodiment as the called terminal is explained. FIG. 6 shows a flow chart of the operation of the control circuit in the receive mode from the sending station (calling terminal) which supports the V.8 protocol by using the facsimile apparatus of the third embodiment of the present invention as the called terminal. FIG. 6 shows steps which are different from those of the first embodiment and the different steps are explained below.

In the step S38 (shown in FIG. 2), the other process is executed and then a step S62 is executed as shown in FIG. 6. In the step S62, whether the call has been selected or not is determined. If the call is selected, a step S66 is executed, and if the call is not selected, the step S32 (shown in FIG. 2) is executed.

In the step S66, a signal of the level '1' is outputted to the signal line 20a to turn on the CML.

After the execution of the step S66, a step S68 is executed. In the step S68, a signal of the level '1' is outputted to the signal line 20d to output the ANSam signal from the ANSam signal sending circuit 10.

Then, a step S70 is executed. In the step S70, the CM signal from the calling terminal is received and the transmission mode indicated by the CM signal is determined. If the CM signal indicates that the V.34 half duplex communication is permitted, that is, the item '2' shown in FIG. 11 is '1', a step S72 is executed. In the step S72, the JM signal indicating that the V.21, V.27ter, V.29 half duplex, V.17 and V.34 half duplex communications are permitted is sent.

After the execution of the step S72, a step S74 is executed. In the step S74, the CJ signal from the calling terminal is received.

After the reception of the CJ signal, a step S76 is executed. In the step S76, the INFO0a is sent and then the protocol and image transmission by the V.34 are executed. After the execution of the step S76, the process proceeds to the step S32 (shown in FIG. 2).

When the CM signal from the calling terminal indicates that the communications by the V.21, V.27ter, V.29 half duplex and V.17 are permitted and the V.34 half duplex communication is not permitted, that is, the item '12' shown in FIG. 11 is '1' and one of the items '7', '6' and '5' is '1', a step S78 is executed. In the step S78, the JM signal indicating the communications by the V.21, V.27ter, V.29 half duplex and V.17 are permitted is sent.

After the execution of the step S78, a step S80 is executed. In the step S80, the CJ signal from the calling terminal is received.

After the reception of the CJ signal, a step S82 is executed. In the step S82, the transmission of the NSF/CSI/DIS signals, that is, the V.21 protocol and the image transmission by one of the V.27ter, V.29 and V.17 are executed. After the execution of the step S82, the process proceeds to the step S32 (shown in FIG. 2).

[Fourth Embodiment]

A forth embodiment of the present invention is now explained with reference to the drawings.

A facsimile apparatus of the present embodiment has the identical configuration as that of the facsimile apparatus of the first embodiment. Unlike the third embodiment which supports the V.8 protocol and the V.38 protocol and image transmission, the present embodiment does not support the V.34 protocol and image transmission.

Figure 7:
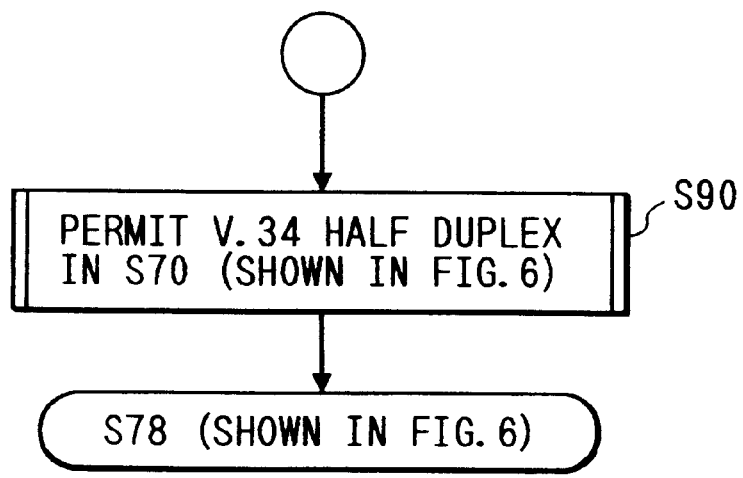

Referring to FIG. 7, an operation of the control circuit 20 in the receive mode from the sending station (calling terminal) which supports the V.8 protocol by using the facsimile apparatus of the present embodiment as the called terminal is explained. FIG. 7 shows a flow chart of the operation of the control circuit in the receive mode from the sending station (calling terminal) which supports the V.8 protocol by using the facsimile apparatus of the fourth embodiment of the present embodiment as the called terminal. FIG. 7 shows steps which are different from those of the third embodiment and the different steps are explained below.

Referring to FIG. 7, in a step S90, the transmission mode indicated by the CM signal from the calling terminal in the step S70 shown in FIG. 6 is determined, and when the CM signal indicates that the V.34 half duplex communication is permitted, the step S78 shown in FIG. 6 is executed because the called terminal does not support the V.34. Namely, whether or not the calling terminal is permitted for the V.34 half duplex communication, the JM signal indicating that the V.21, V.27ter, V.29 half duplex and V.17 communications are permitted is sent.

In the above embodiments, the use of one of the communication by the V.21, V.27ter, V.29 half duplex and V.17 and the V.34 half duplex communication is declared by the CM and JM signals defined by the V.8. As seen from FIG. 11, the permission or non-permission of the V.34 full duplex, V.34 half duplex, V.32bis/V.32, V.22bis/V.22, V.17, V.29 half duplex, V.27ter, V.26ter, V.26bis, V.23 full duplex, V.23 half duplex and V.21 communications may be declared by the CM and JM signals.

It should be understood that the present invention is not limited to the above embodiments and the apparatus having the V.8 communication protocol function described above is equally applicable to any apparatus which executes the communication protocol by a low rate modem and execute the data communication by a high rate modem in accordance with the communication protocol.

What is claimed is:

1. A data communication apparatus comprising:

first protocol means for communicating first protocol signals using modem means operating as a first type of modem, the first protocol signals including information for selecting one of a plurality of types of modem as a first selected type of modem; and second protocol means for communicating second protocol signals using the modem means operating as the first selected type of modem at a corresponding first transmission rate, the second protocol signals designating a second type of modem to be used for data communication and a second transmission rate corresponding to the second type of modem, the second transmission rate being greater than the first transmission rate; and control means for causing the modem means operating as the second type of modem to communicate data at the second transmission rate.

2. A data communication apparatus according to claim 1, wherein said first protocol means executes the V.8 protocol.

3. A data communication apparatus according to claim 1, wherein the first selected type of modem is a V.21 modem and said second protocol means executes the T.30 protocol.

4. A data communication apparatus having modem means capable of operating as any one of a plurality of types of modem, comprising:

first selecting means for selecting, using the V.8 protocol, a first one of the plurality of types of modem;

second selecting means for selecting, using the T.30 protocol, a second one of the plurality of types of modem; and control means for causing a type of modem corresponding to the T.30 protocol to be selected by said first selecting means.

5. A data communicating apparatus according to claim 4, wherein the plurality of types of modem include a V.34 modem, and wherein said control means causes said first selecting means to select the V.34 modem type when the V.8 protocol indicates that a destination has a V.34 modem function.

6. A data communication apparatus capable of communicating data using a modem having a plurality of modulation/demodulation methods, comprising:

first selecting means for selecting a first one of the plurality of modulation/demodulation methods on the basis of performing the V.8 protocol;

control means for causing said first selecting means to select a modulation/demodulation method corresponding to the T.30 protocol as the first selected method; and second selecting means for selecting a second one of the plurality of modulation/demodulation methods and for selecting a transmission rate corresponding to the second selected method on the basis of performing the T.30 protocol using the first selected method.

7. A data communication apparatus according to claim 6, wherein the plurality of types of modulation/demodulation methods include a modulation/demodulation method of a V.34 modem, and wherein said control means causes said first selecting means to select the modulation/demodulation method of a V.34 modem in a case where the V.8 protocol indicates that a destination has the modulation/demodulation method of a V.34 modem.

8. A data communication method comprising the steps of:

communicating first protocol signals using modem means operating as a first type of modem, the first protocol signals including information for selecting one of a plurality of types of modem as a first selected type of modem; and communicating second protocol signals using the modem means operating as the first selected type of modem at a corresponding first transmission rate, the second protocol signals designating a second type of modem to be used for data communication and a second transmission rate corresponding to the second type of modem, the second transmission rate being greater than the first transmission rate; and controlling the modem means operating as the second type of modem to communicate data at the second transmission rate.

9. A data communication method according to claim 8, wherein said first communicating step executes the V.8 protocol.

10. A data communication method according to claim 8, wherein the first selected type of modem is a V.21 modem and said second communicating step executes the T.30 protocol.

11. A data communication method capable of operating in accordance with any one of a plurality of types of modem, comprising:

selecting, using the V.8 protocol, a first one of the plurality of types of modem;

selecting, using the T.30 protocol, a second one of the plurality of types of modem; and causing a type of modem corresponding to the T.30 protocol to be selected by said first selecting step.

12. A data communicating method according to claim 11, wherein the plurality of types of modem include a V.34 modem, and wherein said causing step causes said first selecting step to select the V.34 modem type when the V.8 protocol indicates that a destination has a V.34 modem function.

13. A data communication method capable of communicating data using any of a plurality of modulation/demodulation methods, comprising the steps of:

selecting a first one of the plurality of modulation/demodulation methods on the basis of performing the V.8 protocol;

causing said first selecting step to select a modulation/demodulation method corresponding to the T.30 protocol as the first selected method; and selecting a second one of the plurality of modulation/demodulation methods and for selecting a transmission rate corresponding to the second selected method on the basis of performing the T.30 protocol using the first selected method.

14. A data communication method according to claim 13, wherein the plurality of types of modulation/demodulation methods include a modulation/demodulation method of a V.34 modem, and wherein said causing step causes said first selecting step to select the modulation/demodulation method of a V.34 modem in a case where the V.8 protocol indicates that a destination has the modulation/demodulation method of a V.34 modem.

* * * * *

UNITED STATES PATENT AND TRADEMARK OFFICE
CERTIFICATE OF CORRECTION

PATENT NO. : 6,122,071
DATED : September 19, 2000
INVENTOR(S) : TAKEHIRO YOSHIDA It is certified that error appears in the above-identified patent and that said Letters Patent is hereby corrected as shown below:

COLUMN 4

Line 3, "a" should read --an--.

COLUMN 6

Line 19, "V.35" should read --V.34--.
  Line 27, "indicate" should read --indicates--.

COLUMN 7

Line 42, "the MCF signal unit it receives the flag."
    should read --a flag until it receives the
    MCF signal.--.

COLUMN 9

Line 54, "forth" should read --fourth--.
  Line 59, "V.38" should read --V.34--.

UNITED STATES PATENT AND TRADEMARK OFFICE
CERTIFICATE OF CORRECTION

PATENT NO. : 6,122,071
DATED : September 19, 2000
INVENTOR(S) : TAKEHIRO YOSHIDA Page 2 of 2

It is certified that error appears in the above-identified patent and that said Letters Patent is hereby corrected as shown below:

COLUMN 10

Line 3, "present embodiment" should read --present invention--.
  Line 29, "execute" should read --executes--.

COLUMN 11

Line 1, "communicating" should read --communication--.

COLUMN 12

Line 16, "communicating" should read --communication--.

Signed and Sealed this

Fifteenth Day of May, 2001

Attest:

NICHOLAS P. GODICI

*Attesting Officer*    *Acting Director of the United States Patent and Trademark Office*